(12) United States Patent
Niedermeier

(10) Patent No.: US 8,463,631 B2
(45) Date of Patent: Jun. 11, 2013

(54) SYSTEM AND METHOD TO IMPLEMENT A BUSINESS MODEL FOR DETERMINING A RELIABLE ECOLOGICAL BALANCE OF A SPECIFIC PRODUCT

(75) Inventor: Christoph Niedermeier, München (DE)

(73) Assignee: Siemens Aktiengesellschaft, Munich (DE)

( * ) Notice: Subject to any disclaimer, the term of this patent is extended or adjusted under 35 U.S.C. 154(b) by 501 days.

(21) Appl. No.: 12/774,075

(22) Filed: May 5, 2010

(65) Prior Publication Data
US 2011/0276353 A1    Nov. 10, 2011

(51) Int. Cl.
*G06Q 30/00*    (2006.01)
(52) U.S. Cl.
USPC .............. 705/7; 705/8; 705/10; 705/11
(58) Field of Classification Search
USPC ................................ 705/7, 8, 10, 11
See application file for complete search history.

(56) References Cited

U.S. PATENT DOCUMENTS

| | | | |
|---|---|---|---|
| 2008/0069641 A1* | 3/2008 | Kreiner et al. | 405/129.5 |
| 2009/0241797 A1* | 10/2009 | Costa | 104/29 |
| 2010/0274629 A1* | 10/2010 | Walker et al. | 705/10 |

* cited by examiner

*Primary Examiner* — Nga B. Nguyen
(74) *Attorney, Agent, or Firm* — King & Spalding L.L.P.

(57) ABSTRACT

A system and a method implements a business model for determining a reliable eco-balance of a specific product. An eco-balance typically has consumption of resources, e.g. water consumption, energy consumption and waste products, e.g. CO2 production. Incoming products and outgoing products having a Radio Frequency Identification (RFID) tag for storing their own ecological balance. A calculation unit for each link of a whole product chain of the specific product, is calculating an aggregated ecological balance from parameters of the process of the actual link and from ecologic balances of incoming products, if there are any, and storing it to the Radio Frequency Identification (RFID) tag of the outgoing product of the actual link.

8 Claims, 3 Drawing Sheets

SYSTEM AND METHOD TO IMPLEMENT A BUSINESS MODEL FOR DETERMINING A RELIABLE ECOLOGICAL BALANCE OF A SPECIFIC PRODUCT

TECHNICAL FIELD

The present disclosure relates to the field of ecological products, and specifically to a system and method to implement a business model for determining a reliable environmental or ecological balance of these products.

Still more particularly, the present disclosure relates to electronically detecting the consumption of energy and resources as well as the waste products emanating from processing, manufacturing, transportation and so on.

BACKGROUND

Enterprises use their internal environmental information system to determine the eco-balance of production processes. Institutes for environmental studies provide calculations of production or logistic chains based on publically available data. This generic approach however does not allow a reliable environment balance for specific a product.

SUMMARY

According to various embodiments, a system and a method to implement a business model for determining a reliable eco-balance of a specific product can be provided.

According to an embodiment, a system to implement a business model for determining a reliable ecological balance of a specific product may comprise incoming products and outgoing products each having a Radio Frequency Identification (RFID) tag for storing their own ecological balance, a calculation unit for each link of a whole product chain of the specific product, wherein the calculation unit is calculating at least ecological parameters for the process of an actual link, wherein the calculation unit is reading ecological parameters out of the Radio Frequency Identification (RFID) tags of the incoming products, if there are any, and wherein the calculation unit is calculating an aggregated ecological balance from these ecological parameters and is storing it to the Radio Frequency Identification (RFID) tag of the outgoing product of the actual link.

According to another embodiment, a method to implement a business model for determining a reliable ecological balance of a specific product, may comprise the steps of: —calculating at least ecological parameters for a process of an actual link of a product chain of the specific product, —reading ecological parameters out of the Radio Frequency Identification (RFID) tags of incoming products, if there are any, —calculating an aggregated ecological balance from these ecological parameters and —storing the aggregated ecological balance to the Radio Frequency Identification (RFID) tag of the outgoing product of the actual link.

According to a further embodiment of the system, the calculation unit may calculate at least ecological parameters for the process of an actual link, comprising an apportionment of ecological parameters of transportation and storage by volume or weight. According to a further embodiment of the method, calculating at least ecological parameters for a process of an actual link may comprise an apportionment of ecological parameters of transportation and storage by volume or weight. According to a further embodiment, ecological parameters may comprise genetic modifications. According to a further embodiment, the Radio Frequency Identification (RFID) tags may comprise passive tags and/or active tags with built-in sensors.

BRIEF DESCRIPTION OF THE DRAWINGS

The various embodiments and its advantages will best be understood by reference to the following detailed description when read in conjunction with the accompanying drawings, where.

DETAILED DESCRIPTION

An eco-balance typically comprises consumption of resources, e.g. water consumption, energy consumption and waste products, e.g. $CO_2$ production.

Incoming products and outgoing products having a Radio Frequency Identification (RFID) tag for storing their own eco-balance. A calculation unit for each link of a whole product chain of the specific product, may calculate an aggregated ecological balance from parameters of the process of the actual link and from ecologic balances of incoming products, if there are any, and store it to the Radio Frequency Identification (RFID) tag of the outgoing product of the actual link.

Figure 1:
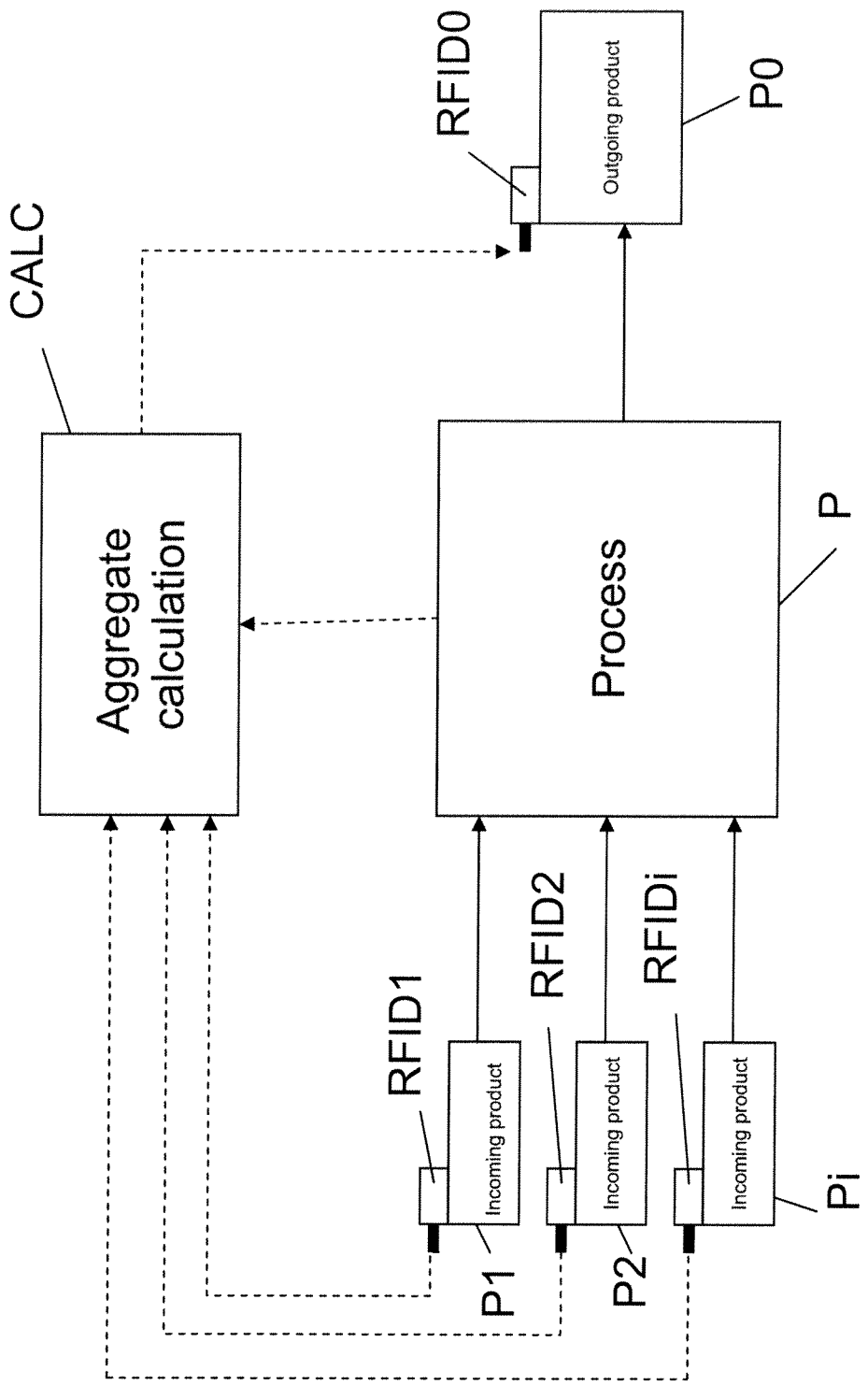
FIG. 1 depicts an embodiment of one stage of the system.

With reference now to the figures, and in particular to FIG. 1, there is depicted an embodiment of one stage of the system which corresponds to one link of a whole product chain of a specific product. One stage comprises in any case a process P and a corresponding calculation unit CALC which is calculating an actual ecological balance from ecological parameters of the actual process and storing it to a Radio Frequency Identification (RFID) tag RFID0 on an actual out going product P0.

If there are incoming products P1, P2, ... Pi with Radio Frequency Identification (RFID) tags RFID1, RFID2, ... RFIDi the calculation unit CALC additionally aggregates all corresponding ecological parameters from these RFIDs containing the aggregated ecological balances of predecessor links of the product chain respectively from earlier stages of the system to the actual ecological balance.

The Radio Frequency Identification (RFID) tags of the system according to various embodiments can either be cheap passive tags on the low end or active tags with built-in sensors on the high end or even a combination of them.

Figure 2:
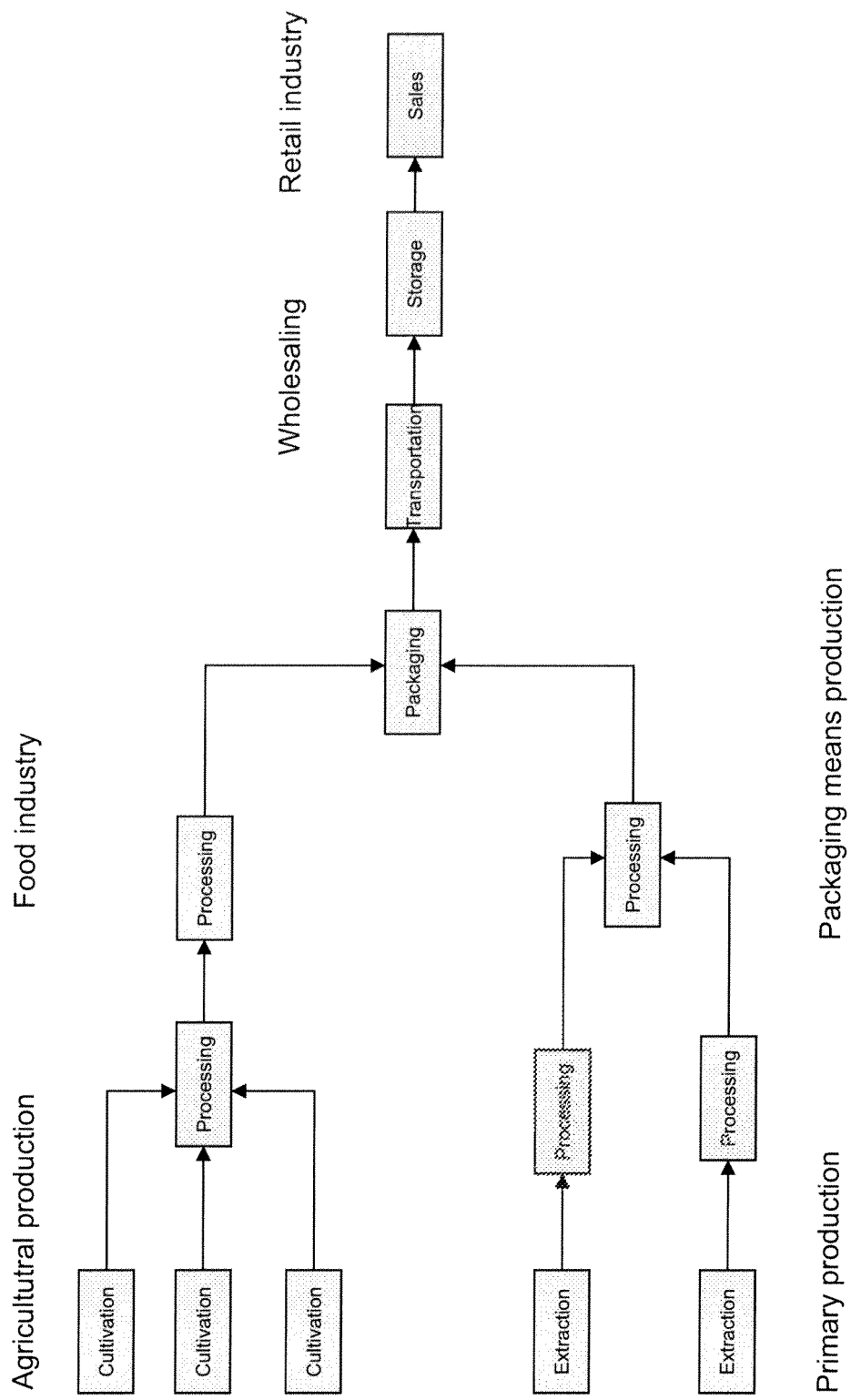
FIG. 2 illustrates an exemplary production/logistic chain in which the various embodiments may be utilized and FIG. 3 is a flow chart depiction of an embodiment of one stage of the method.

Referring now to FIG. 2, an exemplary production/logistic chain in which the various embodiments may be utilized is presented showing a food production chain with all participating sectors. Herewith it becomes apparent that each stage or link of the product chain uses the same basic structure depicted in FIG. 1.

At the beginning is the agricultural production which is starting from processes like cultivation and a down stream process processing which is constituting an input for the food industry with a further process processing which provides an input for further process packaging.

Basically there is primary production in parallel comprising processes like extraction and processing and a downstream process processing within packaging means production providing a second input to the process packaging. After the process packaging there is wholesaling with processes like transportation and storage and finally there is retail industry with its process sales.

Especially in the context food production eco-parameters can optionally also comprise genetic modifications.

The product chain of the automotive industry with its enormous variety of components, subcomponents and materials having their own production chains is for example also an excellent use case according to various embodiments.

The automotive industry is also an excellent use case showing that the system or method according to various embodiments is not limited to the production of a specific product—it can be optionally used as a starting point for or even as integral part of board computer systems of modern eco-cars having features like e. g. an indication of the current total eco-balance of the car during the whole lifecycle including its formation.

Figure 3:
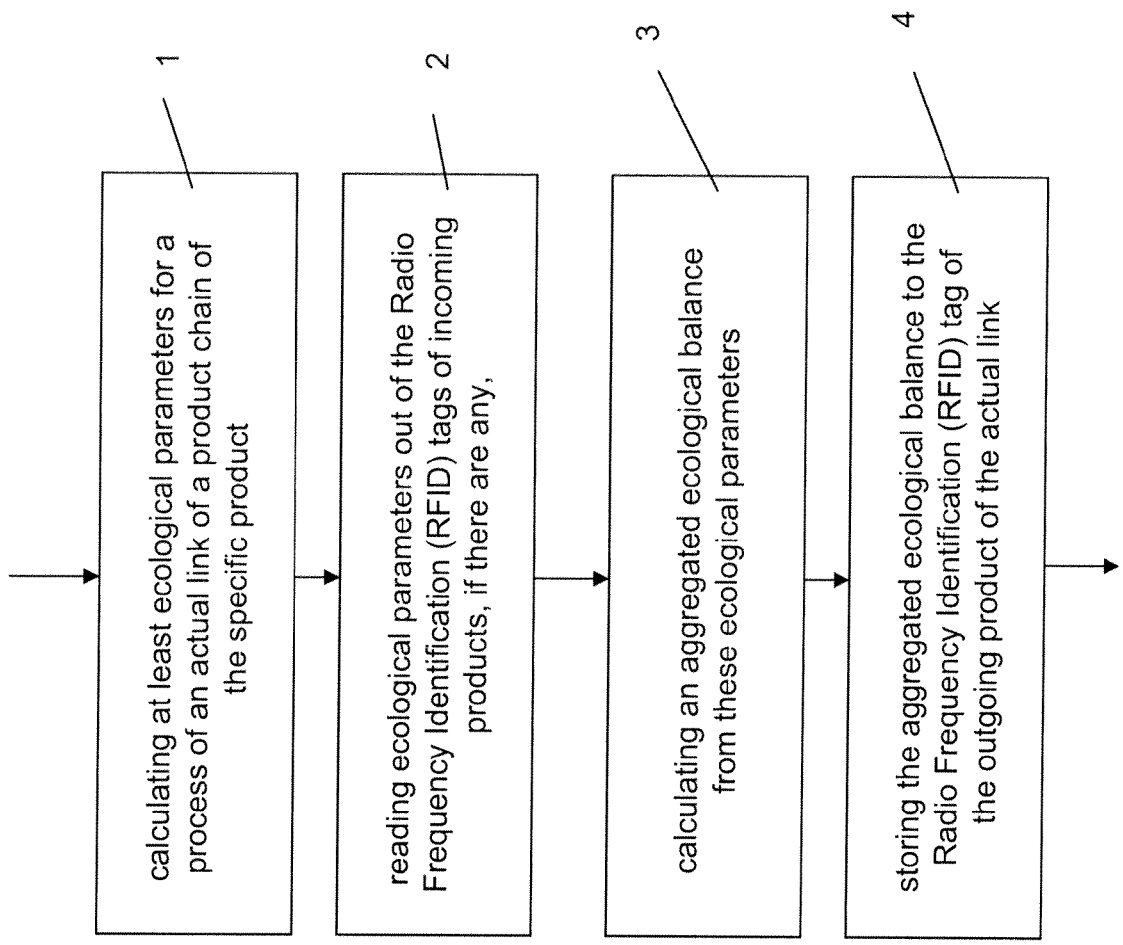

As shown in FIG. 3 the method according to various embodiments comprises four basic steps 1 . . . 4. The first basic step 1 is calculating at least ecological parameters for a process of an actual link of a product chain of the specific product. The second basic step 2 is reading ecological parameters out of the Radio Frequency Identification (RFID) tags RFID1 . . . RFIDi of incoming products P1 . . . P4, if there are any. The third basic step 3 is calculating an aggregated ecological balance from the ecological parameters of the process of the actual link and from ecological parameters out of the tags of incoming products, if there are any. The fourth basic step 4 is storing the aggregated ecological balance to the Radio Frequency Identification (RFID) tag RFID0 of the outgoing product P0 of the actual link of the product chain.

In the very beginning, when upstream products respectively incoming products with tags or ecologic parameters still not exist, optionally estimated or typical eco-parameter values can be entered manually into the actual calculation unit CALC, too.

Obviously, numerous modifications and variations of the various embodiments are possible in the light of the above teachings. It is therefore to be understood that within the scope of the appended claims, the invention may be practiced otherwise than as specifically described herein.

What is claimed is:

1. A system to implement a business model for determining a reliable ecological balance of a specific product, the system comprising:
   incoming products and outgoing products each having a Radio Frequency Identification (RFID) tag for storing their own ecological balance,
   a calculation unit for each link of a whole product chain of the specific product,
   wherein the calculation unit is operable to calculate at least ecological parameters for the process of an actual link,
   wherein the calculation unit is further operable to read ecological parameters out of the Radio Frequency Identification (RFID) tags of the incoming products, and
   wherein the calculation unit is further operable to calculate an aggregated ecological balance from these ecological parameters and to store the aggregated ecological balance to the Radio Frequency Identification (RFID) tag of the outgoing product of the actual link.

2. The system according to claim 1, wherein the calculation unit is further operable to calculate at least ecological parameters for the process of an actual link, comprising an apportionment of ecological parameters of transportation and storage by volume or weight.

3. The system according to claim 1, wherein ecological parameters comprise genetic modifications.

4. The system of claim 1, wherein the Radio Frequency Identification (RFID) tags comprise at least one of passive tags and active tags with built-in sensors.

5. A method for determining a reliable ecological balance of a specific product, the method comprising the steps of:
   using a processing unit to calculate at least ecological parameters for a process of an actual link of a product chain of the specific product,
   using the processing unit to read ecological parameters out of the Radio Frequency Identification (RFID) tags of incoming products,
   using the processing unit to calculate an aggregated ecological balance from these ecological parameters and
   using the processing unit to store the aggregated ecological balance to the Radio Frequency Identification (RFID) tag of the outgoing product of the actual link.

6. The method according to claim 5, wherein calculating at least ecological parameters for a process of an actual link comprises an apportionment of ecological parameters of transportation and storage by volume or weight.

7. The method according to claim 5, wherein ecological parameters comprise genetic modifications.

8. The method according to claim 5, wherein the Radio Frequency Identification (RFID) tags comprise at least one of passive tags and active tags with built-in sensors.

* * * * *